United States Patent Office 3,657,311
Patented Apr. 18, 1972

3,657,311
DI(CIS-3,3,5-TRIMETHYLCYCLOHEXYL)
PEROXYDICARBONATE
Antonio Joseph D'Angelo, Buffalo, N.Y., assignor to
Pennwalt Corporation, Philadelphia, Pa.
No Drawing. Filed July 15, 1969, Ser. No. 841,998
Int. Cl. C07c 73/10; C07f 1/60
U.S. Cl. 260—463
3 Claims

ABSTRACT OF THE DISCLOSURE

Essentially pure di(cis - 3,3,5 - trimethylcyclohexyl) peroxydicarbonate and solid cis-trans peroxydicarbonates having at least 70% of the 3,3,5-trimethylcyclohexyl radicals of the cis form. These are initiators for the polymerization of monomers containing ethylenic unsaturation, such as, ethylene, vinyl chloride and allyl phthalate, to solid polymers.

BACKGROUND OF THE INVENTION

(1) Field of the invention

This invention relates to di(cis - 3,3,5 - trimethylcyclohexyl) peroxydicarbonates and certain cis-trans peroxydicarbonates; and to the use of these as initiators for the polymerization of monomers containing ethylenic unsaturation to solid polymers.

(2) Description of the prior art

Dialkyl peroxydicarbonates, such as, di-isopropyl peroxydicarbonate and di-n-butyl peroxydicarbonate; dicycloalkyl peroxydicarbonates, such as, di-cyclohexyl peroxydicarbonate; and di-aralkyl peroxydicarbonates, such as, di-benzyl peroxydicarbonate, are known. Many such compounds and methods of preparation thereof are known—U.S. Pats. Nos. 2,370,588 and 2,464,062 and J. Am. Chem. Soc. 72, 1254 (1950).

A serious drawback to the general use of the di-alkyl peroxydicarbonates and di-cyclohexyl peroxydicarbonate is that they must be handled, transported and stored under refrigeration. These compounds decompose rapidly at ordinary room temperatures and often decompose explosively, due to the exothermic nature of the decomposition. In order to decrease the hazards of using these compounds, they have been used in solution in aromatic and cycloalkane solvents, or in connection with free-radical traps, such as, iodine, phenol, and nitrobenzene.

Canadian Pat. No. 765,844 discloses the compound di(3,3,5-trimethylcyclohexyl) peroxydicarbonate and reports its storage stability at 30° C. as "complete decomposition within 2 days." This compound is not characterized in the Canadian patent in any manner except for this storage test. Data presented herein establish that this "Canadian" compound is the trans isomer, i.e., di(trans-3,3,5-trimethylcyclohexyl) peroxydicarbonate.

SUMMARY OF THE INVENTION

It has been discovered that essentially pure di(cis-3,3,5-trimethylcyclohexyl) peroxydicarbonate and solid di(cis-trans-3,3,5-trimethylcyclohexyl) peroxydicarbonates having at least 70% of the 3,3,5-trimethylcyclohexyl radicals of the cis form are much more stable than the trans isomer.

The compounds of the invention are efficient initiators for the polymerization to solid polymers of monomers containing ethylenic unsaturation, which are polymerizable by the use of peroxydicarbonate initiators. Taking into account the difference in efficiency, the compounds or mixtures of the invention may be substituted for the peroxydicarbonates now used in these polymerizations. (It is to be understood that "polymerization" as used herein includes copolymerization and like reactions.)

DESCRIPTION OF THE INVENTION AND WORKING EXAMPLES

Essentially pure di(cis - 3,3,5 - trimethylcyclohexyl) peroxydicarbonate is a crystalline solid melting at 81–82° C. Solid cis-peroxydicarbonate melting at 70–72° C. has a storage stability at 30° C. of at least 30 days.

Di(trans-3,3,5-trimethylcyclohexyl) peroxydicarbonate is a liquid at ordinary room temperature. Trans-peroxydicarbonate having a purity of 86%, by active oxygen assay, on storage at 30° C. decomposes completely in less than 48 hours.

However, acceptable storage stability is afforded by compositions or compounds containing both the cis and the trans form of the 3,3,5-trimethylhexyl radical, when the cis from is present to the extent of at least 70%. The cis-trans peroxydicarbonate may be a physical mixture of the cis isomer and the trans isomer or a "compound" mixture of the pure cis isomer, the pure trans isomer and cis-trans isomer, i.e., a molecule having one cis radical and one trans radical.

In the case of the cis-trans peroxydicarbonate compositions, it is preferred that the composition contain at least about 80% of the cis isomer.

The peroxydicarbonates of the invention are solids which are soluble in saturated hydrocarbon solvents—a requisite for ethylene polymerization. They are not impact sensitive and can be handled, transported and stored at atmospheric temperatures for extended periods of time without substantial loss of active oxygen.

The peroxydicarbonates of the invention are useful in the bleaching of flour, as oxidizing agents, as driers for linseed, tung, and soybean oils, and as sources of free-radicals. A utility of especial interest is in the polymerization of monomers containing ethylenic unsaturation to solid polymers (this includes the curing of unsaturated polyester resin-vinyl monomer blends).

Illustrative of such ethylenic monomers are ethylene, propylene, butadiene and isoprene; vinyl monomers, such as, vinyl chloride, vinyl acetate, vinyl stearate, ethyl acrylate and other acrylates, methyl methacrylate and other methacrylates, acrylonitriles and methacrylonitriles, acrylamide and N-substituted acrylamides, vinylidene chloride, divinyl succinate and divinyl adipate; and compounds containing allyl group(s), such as, allyl phthalate, allyl acetate, and allylcarbonate. It is to be understood that the above listing is not limiting as the peroxydicarbonates of this invention may be used as initiators for such ethylenic compounds as are polymerizable by the use of peroxydicarbonate initiators.

EXAMPLE I

Preparation of di(cis-3,3,5-trimethylcyclohexyl)
peroxydicarbonate 33.7 g. (0.49 mole) of 50% hydrogen peroxide was cooled to about +5° C. 198.0 g. (0.99 mole) of 20% aqueous sodium hydroxide was slowly added, with stirring, to the hydrogen peroxide while holding the temperature to about +10° C. Then 144.0 g. of water of 0.1 g. of an alkyl aryl polyethylene glycol surfactant (Aquet, Manostat Corp.) in aqueous solution, were added. Then 191.0 g. (0.90 mole) of 96.5% cis - 3,3,5 - trimethylcyclohexyl chloroformate was added, with stirring, at a rate such that the reaction mixture was held at a about 10° C. The temperature was allowed to rise to 25° C. with stirring for 30 minutes. Then the mixture was stirred for 6 hours at about 40° C.

Then the reaction product mixture was cooled to about 10° C., and a solid was recovered by filtration, washed with water to neutral, and air dried. The solid was obtained in 93% yield, had an active oxygen assay of 95%, and a melting point of 62–65° C.

The crude peroxydicarbonate was recrystallized from pentane to obtain crystalline solid melting at 77–79° C.

EXAMPLE II

Preparation of di(trans-3,3,5-trimethylcyclohexyl) peroxydicarbonate

Using the procedure of Example I, except that trans-3,3,5-trimethylcyclohexyl chloroformate was used as reactant, the trans isomer was obtained. This is a liquid material; the product assayed 86% purity.

EXAMPLE III

Physical mixtures of the cis isomer and trans isomer

Weighted amounts of the isomers of Examples I and II were dissolved in pentane and then the solid mixture recovered. By this technique the following mixtures were obtained:

|   | Cis isomer, percent | trans isomer, percent |
|---|---|---|
| 1 | 90 | 10 |
| 2 | 80 | 20 |
| 3 | 70 | 30 |
| 4 | 50 | 50 |

EXAMPLE IV

Storage stability at +30° C. and half-life determination

Half-life determinations were made according to the procedure of Doehnert and Mageli, Modern Plastics, 36, No. 6, p. 142 (February 1959). These determinations were made in Mineral Spirits solution at 50° C. Results are set out in Table 1.

A standard procedure was employed as follows: 325 ml. clear "pop" bottles were used as the reactors. The test began with the addition of aqueous suspension medium to the bottle; the standard medium had the following composition:

|   | Ml. |
|---|---|
| Water, distilled | 210 |
| Methylcellulose, 1% aqueous solution | 20 |
| Sorbitan monostearate, 1% aq. sol. | 10 |
| Polyoxyethylene sorbitan monostearate, 1% aq. sol. | 10 |

The bottle was charged with the medium and held at −20° C., until the contents were frozen. Then the desired amount of the peroxydicarbonate was added to the bottle. Then 100 g. of vinyl chloride monomer was charged, at about −15° C. The bottle was then crown capped using an inert seal. The capped bottle enclosed in a safety cage. If the polymerization was not to be started immediately, the bottle was stored at low temperature to prevent polymerization.

The bottle in its safety cage was placed in a tumbling device immersed in a constant temperature bath. The bottle was tumbled at 25 revolutions per minute during the entire reaction time. Then the bottle was removed from the bath and from the cage. It was held at about 0° C. while the monomer was vented by way of a hypodermic syringe needle, through the cap.

The standard procedure has been described for one bottle. However, in each test a number of bottles were prepared in order to have duplicates and to permit the course of the reaction to be followed by removing a bottle at certain times during the total reaction time. All tests reported here were run for 8 hours at +50° C.

The number of moles of the particular peroxydicarbonate required to give 90% conversion of the vinyl chloride charged was calculated from a plot of results of different sample bottles. Table 2 gives the mole requirement for 90% conversion in 8 hours at +50° C. for the peroxydicarbonates tested.

TABLE 1

| Di-R peroxy dicarbonate | Half-life (hours)[1] | Assay at (days)— | | | | |
|---|---|---|---|---|---|---|
| | | Start | 1 | 2 | 7 | 14 | 28 |
| Isopropyl | 5.4 | Explosive decomposition in ¼ hr. | | | | |
| n-Butyl | 3.9 | Explosive decomposition in ¼ hr. | | | | |
| Cyclohexyl | 2.7 | 100% decomposition in 2 days [2] | | | | |
| Cis isomer [3] | 5.3 | 95 | | 95 | 95 | 94 | 94 |
| 90/10 [4] | | 95 | 95 | 95 | 94 | 83 | |
| 80/20 [4] | | 95 | 94 | 95 | 91 | 84 | |
| 70/30 [4] | | 92 | 89 | 83 | 26 | | |
| 50/50 [4] | | 90 | 39 | 23 | | | |
| Trans [5] | 5.3 | 86 | 26 | 4 | | | |

[1] Determined in mineral spirit at 50° C.
[2] Taken from Canadian Patent 765,844.
[3] 3,3,5-trimethylcyclohexyl as prepared in Example I.
[4] Mixtures from Example III.
[5] 3,3,5-trimethylcyclohexyl as prepared in Example II.

Half-life is used in the art as a measure of the probable rate of decomposition of organic peroxides and peroxycarbonates. The above data on half-life clearly are inconsistent with the storage stabilities obtained. At the same half-life, the vast difference between the cis isomer and the trans isomer is astounding. The trans isomer is no better than the cyclohexyl compound, despite the favorable longer half-life.

EXAMPLE V

Suspension polymerization of vinyl chloride

The following working examples and comparative tests are concerned with suspension polymerization of vinyl chloride monomer to obtain solid homopolymer. It is to be understood that these examples do not limit the scope of the invention.

TABLE 2

| Di-R peroxydicarbonate: | Initiator required mole × 10⁻⁴ |
|---|---|
| Isopropyl | 1.7 |
| t-Butylcyclohexyl (4 isomer) | 1.6 |
| Cis-3,3,5-trimethylcyclohexyl | 1.4 |
| Cis-trans 70/30 | 1.6 |
| Trans-3,3,5-trimethylcyclohexyl | 1.8 |

These results show that the cis isomer and the 70/30 mixture are better than the commercially used isopropyl compound and the known trans isomer.

Thus having described the invention, what is claimed is:
1. A solid composition selected from the class consisting of (a) essentially pure di(cis-3,3,5-trimethylcyclohexyl) peroxydicarbonate and (b) di(cis-trans-3,3,5-trimethylcyclohexyl) peroxydicarbonate having at least 70% of said cyclohexyl radicals of the cis form.

2. A composition according to claim 1 where the peroxydicarbonate of (b) is at least about 80% cis isomer.

3. Solid, essentially pure di(cis-3,3,5-trimethylcyclohexyl) peroxydicarbonate.

References Cited

UNITED STATES PATENTS 3,499,919   3/1970   Gerritsen _____ 260—463

LEWIS GOTTS, Primary Examiner

D. G. RIVERS, Assistant Examiner

U.S. Cl. X.R.

99—232; 106—264; 260—77.5 UA, 78.4 U, 88.7 D, 89.1, 89.5 A, 89.7 R, 91.7, 92.8 W, 94.2 R, 94.9 CD